United States Patent
Im et al.

(10) Patent No.: US 10,101,612 B2
(45) Date of Patent: Oct. 16, 2018

(54) POLARIZATION SELECTION COLOR FILTER AND DISPLAY DEVICE HAVING THE SAME

(71) Applicant: SAMSUNG DISPLAY CO., LTD., Yongin-Si, Gyeonggi-Do (KR)

(72) Inventors: Hyundeok Im, Yongin-si (KR); Jaewoong Kang, Yongin-si (KR); Jonghyuk Kang, Yongin-si (KR); Deahyun Kim, Yongin-si (KR); Jaebyung Park, Yongin-si (KR); Jooyeol Lee, Yongin-si (KR); Hyunmin Cho, Yongin-si (KR)

(73) Assignee: Samsung Display Co., Ltd. (KR)

( * ) Notice: Subject to any disclaimer, the term of this patent is extended or adjusted under 35 U.S.C. 154(b) by 39 days.

(21) Appl. No.: 15/176,075

(22) Filed: Jun. 7, 2016

(65) Prior Publication Data
US 2017/0102588 A1    Apr. 13, 2017

(30) Foreign Application Priority Data

Oct. 13, 2015 (KR) .................. 10-2015-0143041

(51) Int. Cl.
  *G02F 1/1335*  (2006.01)
  *G02F 1/1343*  (2006.01)

(52) U.S. Cl.
  CPC .. *G02F 1/133621* (2013.01); *G02F 1/133514* (2013.01); *G02F 1/133528* (2013.01);
  (Continued)

(58) Field of Classification Search
  CPC ................................. G02F 1/133621
  See application file for complete search history.

(56) References Cited

U.S. PATENT DOCUMENTS

| | | | |
|---|---|---|---|
| 6,650,045 B1 * | 11/2003 | Forrest | H01L 51/5271 313/503 |
| 2010/0117997 A1 * | 5/2010 | Haase | H01L 27/156 345/204 |

(Continued)

FOREIGN PATENT DOCUMENTS

| | | |
|---|---|---|
| KR | 10-2012-0048218 A | 5/2012 |
| KR | 10-2013-0046495 A | 5/2013 |

(Continued)

OTHER PUBLICATIONS

Jiangtao Hu et al., "Linearly Polarized Emission from Colloidal Semiconductor Quantum Rods," Science, Jun. 15, 2001, pp. 2060-2063, vol. 292.

(Continued)

*Primary Examiner* — Sang V Nguyen
(74) *Attorney, Agent, or Firm* — Innovation Counsel LLP

(57) ABSTRACT

A polarization selection color filter includes: a first color conversion layer including a plurality of first quantum rods absorbing light of a first wavelength and emitting light of a second wavelength that is longer than the first wavelength; and a second color conversion layer including a plurality of second quantum rods disposed on the first color conversion layer, absorbing the light of the second wavelength and emitting light of a third wavelength that is longer than the second wavelength. The polarization selection color filter is applicable to a color filter array of a display device and may improve a contrast ratio.

20 Claims, 24 Drawing Sheets

(52) U.S. Cl.
CPC .. *G02F 1/133617* (2013.01); *G02F 1/134309* (2013.01); *G02F 2001/133614* (2013.01); *G02F 2201/121* (2013.01); *G02F 2202/36* (2013.01); *G02F 2203/05* (2013.01)

(56) References Cited

U.S. PATENT DOCUMENTS

| | | | |
|---|---|---|---|
| 2011/0299001 A1 | 12/2011 | Banin et al. | |
| 2012/0113672 A1* | 5/2012 | Dubrow | B82Y 20/00 362/602 |
| 2012/0250351 A1* | 10/2012 | Shin | G02F 1/133603 362/608 |
| 2013/0107170 A1 | 5/2013 | Gee et al. | |
| 2013/0135558 A1 | 5/2013 | Kim et al. | |
| 2013/0335799 A1 | 12/2013 | Yoon et al. | |
| 2014/0091275 A1* | 4/2014 | Coe-Sullivan | H01L 51/5268 257/13 |
| 2014/0160408 A1 | 6/2014 | Cho et al. | |
| 2015/0146452 A1* | 5/2015 | Kim | F21V 9/14 362/611 |
| 2015/0228232 A1* | 8/2015 | Lee | G09G 3/3607 345/88 |
| 2016/0223732 A1* | 8/2016 | Jeon | G02F 1/133609 |
| 2016/0223863 A1* | 8/2016 | Mizunuma | G02F 1/133617 |
| 2016/0320664 A1* | 11/2016 | Kang | G02F 1/133528 |
| 2016/0327719 A1* | 11/2016 | Kitahara | G02B 6/005 |
| 2016/0372528 A1* | 12/2016 | Kamura | H01L 51/0096 |
| 2017/0084761 A1* | 3/2017 | Cho | H01L 31/02322 |

FOREIGN PATENT DOCUMENTS

| | | |
|---|---|---|
| KR | 10-2013-0140462 A | 12/2013 |
| KR | 10-2014-0000735 A | 1/2014 |
| KR | 10-2014-0074495 A | 6/2014 |
| WO | 2010/095140 A2 | 8/2010 |

OTHER PUBLICATIONS

Benjamin Bruhn et al., "Controlled Fabrication of Individual Silicon Quantum Rods Yielding High Intensity, Polarized Light Emission," Nanotechnology, Nov. 2009, 10 pages, vol. 20, Issue 50.

* cited by examiner

POLARIZATION SELECTION COLOR FILTER AND DISPLAY DEVICE HAVING THE SAME

CROSS-REFERENCE TO RELATED APPLICATION

This application claims the benefit of Korean Patent Application No. 10-2015-0143041, filed on Oct. 13, 2015, in the Korean Intellectual Property Office, the disclosure of which is incorporated herein in its entirety by reference.

BACKGROUND

1. Field

One or more exemplary embodiments relate to a polarization selection color filter and a display device having the same.

2. Description of the Related Art

A liquid crystal display (LCD) device is one of most widely used flat panel display devices. A typical LCD device includes two display plates including electric field-generating electrodes such as a pixel electrode and a common electrode, and a liquid crystal (LC) layer disposed between the two display plates. An image is displayed by applying a voltage to the electric field-generating electrodes to generate an electric field in the LC layer, determining the alignment of LC molecules of the LC layer, and controlling the polarization of incident light.

The LCD device uses a color filter to form a specific color. When light emitted from a backlight light source passes through a red color filter, a green color filter, and a blue color filter, an amount of the light is reduced by about ⅓ by each color filter and thus light efficiency is reduced.

A photo-luminescent liquid crystal display apparatus (PL-LCD) is intended for supplementing the light efficiency reduction and implementing high color reproduction. The PL-LCD replaces a color filter used for an existing LCD device by a quantum dot color conversion layer (QD-CCL). The PL-LCD displays an image by using visible light generated when light in a short wavelength band such as an ultraviolet (UV) ray or blue light generated from a light source and controlled by an LC layer is irradiated onto a color conversion layer (CCL).

Meanwhile, in the case of the PL-LCD, color mixing may be generated by a disposed position of the QD-CCL. An alternative for reducing the color mixing and enabling grey expression is sought for.

SUMMARY

One or more exemplary embodiments include a display device that improves color reproduction and light efficiency. Additional aspects will be set forth in part in the description and, in part, will be apparent from the description, or may be learned by practice of the presented embodiments.

According to one or more exemplary embodiments, a polarization selection color filter includes: a first color conversion layer including a plurality of first quantum rods absorbing light of a first wavelength and emitting light of a second wavelength that is longer than the first wavelength; and a second color conversion layer including a plurality of second quantum rods disposed on the first color conversion layer, absorbing the light of the second wavelength and emitting light of a third wavelength that is longer than the second wavelength.

The polarization selection color filter may further include: a band pass filter that allows the light of the first wavelength to be incident onto the first color conversion layer.

The polarization selection color filter may further include: a band cut filter disposed on the second color conversion layer and blocking the light of the first wavelength.

The first color conversion layer may absorb blue light and emit light of a cyan color, and the second color conversion layer may absorb the light of the cyan color and emit red light.

The first color conversion layer may absorb blue light and emit light of a cyan color, and the second color conversion layer may absorb the light of the cyan color and emit green light.

The first color conversion layer may absorb ultraviolet light and emit blue light, and the second color conversion layer may absorb the blue light and emit red light.

The first color conversion layer may absorb ultraviolet light and emit blue light, and the second color conversion layer may absorb the blue light and emit green light.

According to one or more exemplary embodiments, a display device includes: a lower substrate including a first substrate, a lower polarizer formed on a lower surface of the first substrate, and a pixel electrode formed on an upper surface of the first substrate; an upper substrate including a second substrate, an upper polarizer formed on an upper surface of the second substrate, and a color filter array layer and a common electrode formed on a lower surface of the second substrate; and a liquid crystal layer disposed between the lower substrate and the upper substrate, wherein the color filter array layer includes a first color region, a second color region, and a third color region to which light that has passed through the liquid crystal layer is incident and that emit light of a first color, light of a second color, and light of a third color, respectively.

The first color region may include: a first color conversion layer comprising a plurality of first quantum rods absorbing light of a first wavelength and emitting light of a second wavelength that is longer than the first wavelength; and a second color conversion layer disposed on the first color conversion layer and comprising a plurality of second quantum rods absorbing the light of the second wavelength and emitting light of a third wavelength that is longer than the second wavelength.

The second color region may include a third color conversion layer including the plurality of first quantum rods absorbing the light of the first wavelength and emitting the light of the second wavelength that is longer than the first wavelength, and a fourth color conversion layer disposed on the third color conversion layer and including a plurality of third quantum rods absorbing light of the second wavelength and emitting light of a fourth wavelength that is longer than the second wavelength.

The display device may further include: a band pass filter disposed below the first color conversion layer and the third color conversion layer and transmitting the light of the first wavelength.

The display device may further include: a band cut filter disposed above the second color conversion layer and the fourth color conversion layer and blocking the light of the first wavelength.

The display device may further include: dye type first, second, and third color filters disposed on locations that respectively face the first, second, and third color regions, and transmitting the light of the first, second, and third colors between the color filter array layer and the second substrate.

The display device may further include: a backlight unit configured to provide blue light to the liquid crystal layer.

The plurality of first, second, and third quantum rods may be configured such that the first color region emits red light, and the second color region emits green light.

The plurality of first quantum rods may convert the blue light into light of a cyan color, the plurality of second quantum rods may convert the light of the cyan color into the red light, and the plurality of third quantum rods may convert the light of the cyan color into the green light.

The third color region may include a transparent material layer.

The display device may further include: a backlight unit configured to provide ultraviolet light to the liquid crystal layer.

The plurality of first, second, and third quantum rods may be configured such that the first color region emits red light, and the second color region emits green light.

The plurality of first quantum rods may convert the ultraviolet light into blue light, the plurality of second quantum rods may convert the blue light into the red light, and the plurality of third quantum rods may convert the blue light into the green light.

The third color region may include a fifth color conversion layer including a plurality of quantum rods converting the ultraviolet light into blue light.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
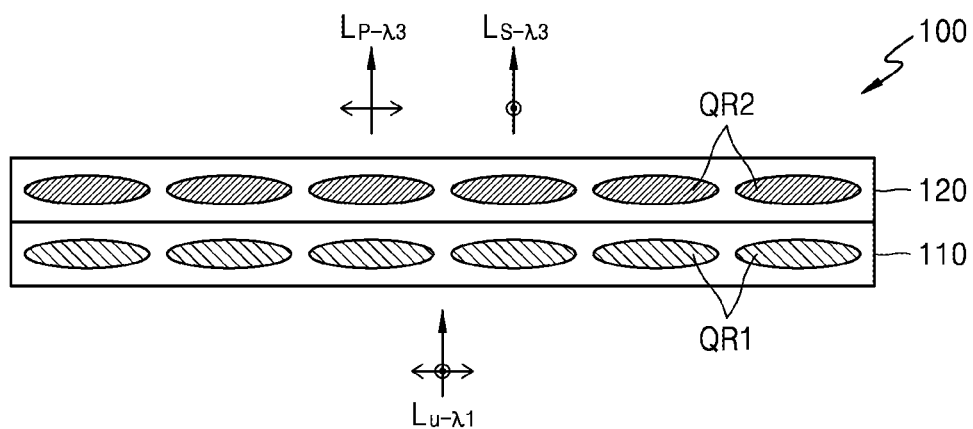
FIG. 1 is a cross-sectional view illustrating a configuration of a polarization selection color filter, according to an exemplary embodiment.

As the present disclosure allows for various changes and numerous embodiments, exemplary embodiments will be illustrated in the drawings and described in detail in the written description. Effects and characteristics of present exemplary embodiments, and a method of accomplishing them will be apparent by referring to content described below in detail together with the drawings. However, the present exemplary embodiments are not limited to exemplary embodiments below and may be implemented in various forms.

Hereinafter, the present disclosure will be described more fully with reference to the accompanying drawings, in which exemplary embodiments of the present disclosure are shown. When description is made with reference to the drawings, like reference numerals in the drawings may denote like or corresponding elements, and repeated description may be omitted.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

It will be understood that when a layer, region, or component is referred to as being "formed on," another layer, region, or component, it can be directly or indirectly formed on the other layer, region, or component. For example, one or more intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments may not be limited thereto.

Figure 2:
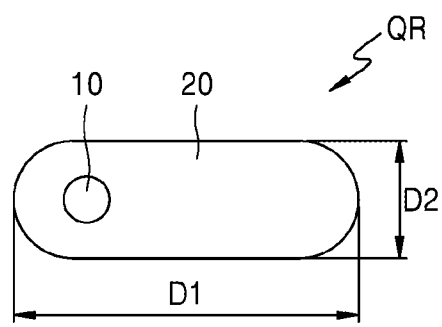
FIG. 2 is a cross-sectional view illustrating a detailed shape of a quantum rod provided to the polarization selection color filter of FIG. 1.

FIG. 1 is a cross-sectional view illustrating a configuration of a polarization selection color filter 100, according to an exemplary embodiment. FIG. 2 is a cross-sectional view illustrating a detailed shape of a quantum rod provided to the polarization selection color filter 100 of FIG. 1.

Referring to FIG. 1, the polarization selection color filter 100 includes a first color conversion layer 110 and a second color conversion layer 120. The first color conversion layer 110 and the second color conversion layer 120 include quantum rods of different kinds, respectively. The first color conversion layer 110 includes a plurality of first quantum rods QR1 absorbing light of a first wavelength and emitting light of a second wavelength that is longer than the first wavelength. The second color conversion layer 120 includes a plurality of second quantum rods QR2 absorbing light of the second wavelength and emitting light of a third wavelength that is longer than the second wavelength.

The second color conversion layer 120 is formed on the first color conversion layer 110, so that light that is color-converted by the first color conversion layer 110 is incident onto the second color conversion layer 120 and color-converted again. Therefore, the polarization selection color filter 100 converts light of the first wavelength into light of the third wavelength, and emits the same.

The first and second quantum rods QR1 and QR2 may be configured so that the first color conversion layer 110 may absorb blue light and emit light of a cyan color, and the second color conversion layer 120 may absorb the light of the cyan color and emit red light. In this case, the polarization selection color filter 100 may convert blue light into red light.

The polarization selection color filter 100 includes a plurality of quantum rods and thus has different color conversion efficiencies depending on polarization. For example, a color conversion efficiency for light of first polarization parallel to a major axis direction of the quantum rods QR1 and QR2 is different from a color conversion efficiency for light of second polarization perpendicular to the first polarization. Hereinafter, the first polarization is referred to as P-polarization and represented by using a symbol ↔, and the second polarization is referred to as S-polarization, and represented by using a symbol ⊙.

When light $L_{u-\lambda 1}$ having the first wavelength of non-polarization in which P-polarization and S-polarization are mixed at random is incident to the polarization selection color filter 100, light of the third wavelength that is longer than the first wavelength is emitted. In this case, since a color conversion efficiency depending on polarization is different, light energy of P-polarization is different from light energy of S-polarization in the emitted light of the third wavelength. In the polarization selection color filter 100 according to an exemplary embodiment, a color conversion efficiency of polarized light parallel to the major axis direction of the quantum rod, that is, light of the P-polarization is high. In this case, light energy $E(L_{P-\lambda 3})$ of the P-polarization of the third wavelength is greater than light energy $E(L_{S-\lambda 3})$ of the S-polarization of the third wavelength. A ratio of $E(L_{P-\lambda 3})$ to $E(L_{S-\lambda 3})$ may be referred to as a polarization selection ratio. The polarization selection ratio may be determined from an aspect ratio of the quantum rods QR1 and QR2, that is, a ratio of a length in a major axis direction to a length in a minor axis direction.

Referring to FIG. 2, the quantum rod QR includes a core 10 forming a center and a shell 20 surrounding the core 10.

The shape of the core 10 may be a circle, and the shape of the shell 20 may be a rod or an ellipse. In the shell 20, a length D1 in a major axis direction is different from a length D2 in a minor axis direction. For example, a ratio of the length D1 in the major axis direction to the length D2 in the minor axis direction, that is, an aspect ratio may have a value ranging from about 1.1 to about 30. A polarization selection ratio may be controlled by the aspect ratio. Though the shape of the core 10 has been illustrated as circular, the core 10 may be a polygon or an ellipse where a major axis and a minor axis are similar. Although FIG. 2 illustrates the shell 20 surrounding the core 10 is provided, this is only exemplary, and the quantum rod QR may include only the core 10. In this case, the shape of the core 10 may be a rod or an ellipse having an aspect ratio greater than 1.

The core 10 may include one of Si-based nano crystal, Group II-VI-based compound semiconductor nano crystal, Group III-V-based compound semiconductor nano crystal, Group IV-VI-based compound semiconductor nano crystal, and a mixture of these. Group II-VI-based compound semiconductor nano crystal may include one of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe. Group III-V-based compound semiconductor nano crystal may include one of GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. Group IV-VI-based compound semiconductor nano crystal may include SbTe.

The shell 20 may have a single-layered structure or a multi-layered structure, and include an alloy, an oxide-based material, and a material doped with impurities. For example, the shell 20 may include the same material as that of the core 10 mixed with impurities.

In the quantum rod QR, a wavelength of emitted light changes depending on the size of the core 10 even when the quantum rod QR includes the core 10 of the same material. When the size of the core 10 is small, light of a short wavelength is emitted. Therefore, almost all light in a desired visible ray band may be emitted by adjusting the size of the core 10. In addition, a polarization selection ratio for light of specific polarization may be raised by adjusting an aspect ratio of the shell 20.

In the polarization selection color filter 100 according to an exemplary embodiment, the first quantum rod QR1 of the first color conversion layer 110 and the second quantum rod QR2 of the second color conversion layer 120 may have cores of different sizes, respectively. In addition, to make a polarization selection ratio constant, the aspect ratio of the shell may be equal but is not limited thereto.

Figure 3A:
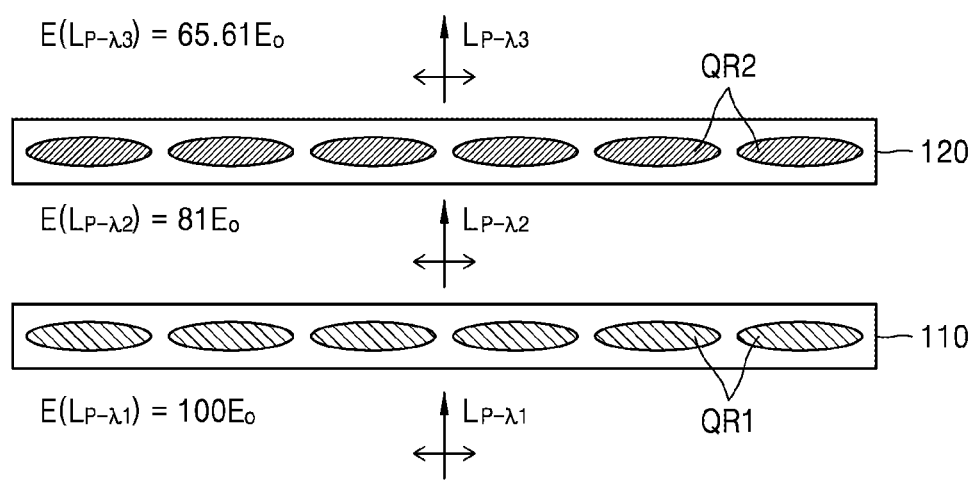
FIGS. 3A and 3B are conceptual views for explaining that the polarization selection color filter of FIG. 1 represents high polarization selectivity.
Figure 3B:
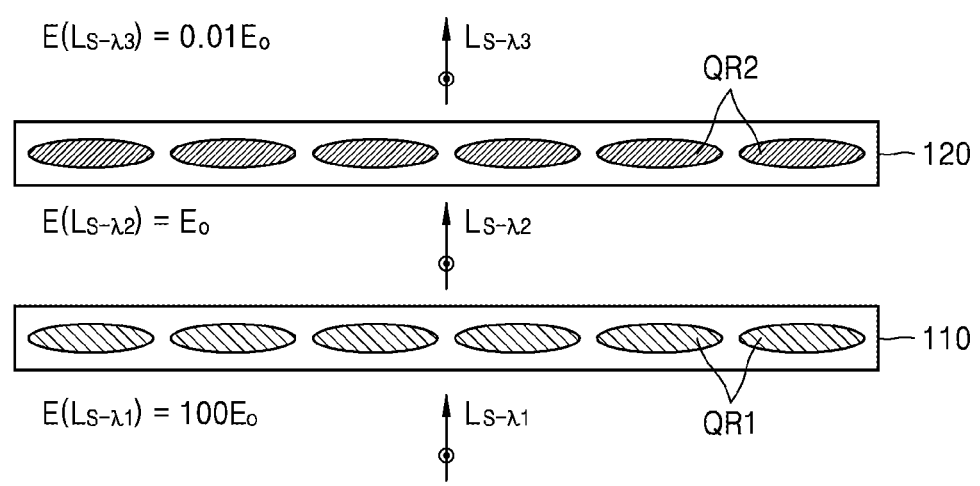

FIGS. 3A and 3B are conceptual views for explaining that the polarization selection color filter 100 of FIG. 1 represents high polarization selectivity. FIG. 3A illustrates that light $L_{P-\lambda 1}$ having P-polarization of the same direction as the major axis of the quantum rods QR1 and QR2 and having the first wavelength is incident to the polarization selection color filter 100.

A color conversion efficiency in the color conversion layers 110 and 120 is represented as the product of a light absorption efficiency to the quantum rods QR1 and QR2 and an emission efficiency at which absorbed light is emitted as light of a different wavelength. The above-described efficiencies are values that may be adjusted by the material, the shape, etc. of the quantum rod. Hereinafter, light of the P-polarization is described on the assumption that the light absorption efficiency to the quantum rods QR1 and QR2 is about 90%, an emission efficiency of the absorbed P-polarized light is about 90%, a light absorption efficiency of S-polarized light to the quantum rods QR1 and QR2 is about 10%, and an emission efficiency of the absorbed S-polarized light is about 10%.

Since a light absorption efficiency at which P-polarized light $L_{P-\lambda1}$ having the first wavelength is absorbed to the first quantum rod QR1 of the first color conversion layer 110 is about 90%, and an emission efficiency of absorbed P-polarized light is about 90%, light energy emitted as P-polarized light $L_{P-\lambda2}$ of the second wavelength is about 81% of light energy of incidence. Assuming that the energy $E(L_{P-\lambda1})$ of P-polarized light $L_{P-\lambda1}$ having the first wavelength is $100E_0$, the energy $E(L_{P-\lambda2})$ of P-polarized light $L_{P-\lambda2}$ of the second wavelength that is emitted from the first color conversion layer 110 is $81E_0$. Next, the light $L_{P-\lambda2}$ is incident to the second color conversion layer 120 and the energy $E(L_{P-\lambda3})$ of light when P-polarized light $L_{P-\lambda3}$ of the third wavelength is emitted from the second color conversion layer 120 is about 81% of the incident light energy $E(L_{P-\lambda2})$. Therefore, the energy $E(L_{P-\lambda3})$ is $65.61E_0$.

FIG. 3B illustrates that light $L_{S-\lambda1}$ having S-polarization of a direction perpendicular to the major axis of the quantum rods QR1 and QR2 and having the first wavelength is incident to the polarization selection color filter 100. Since a light absorption efficiency at which S-polarized light $L_{S-\lambda1}$ having the first wavelength is absorbed to the first quantum rod QR1 of the first color conversion layer 110 is about 10%, and an emission efficiency of absorbed S-polarized light is about 10%, the energy of light emitted as S-polarized light $L_{S-\lambda2}$ having the second wavelength is about 1% of light energy of incidence. Assuming that the energy $E(L_{S-\lambda1})$ of S-polarized light $L_{S-\lambda1}$ having the first wavelength is $100E_0$, the energy $E(L_{S-\lambda2})$ of S-polarized light $L_{S-\lambda2}$ having the second wavelength that is emitted from the first color conversion layer 110 is $E_0$. Next, light $L_{S-\lambda2}$ is incident to the second color conversion layer 120 and energy $E(L_{S-\lambda3})$ when light is emitted as S-polarized light $L_{S-\lambda3}$ having the third wavelength from the second color conversion layer 120 is about 1% of light energy $E(L_{S-\lambda2})$ of incidence. Therefore, the energy $E(L_{S-\lambda3})$ is $0.01E_0$.

As exemplarily described with reference to FIGS. 3A and 3B, a polarization selection ratio of the polarization selection color filter 100, $E(L_{P-\lambda3}):E(L_{S-\lambda3})$, is $65.61E_0:0.01E_0$, or 6561:1.

Such a high polarization selection ratio results from configuring a plurality of layers by using quantum rods of different kinds. For example, in the case where the polarization selection color filter is implemented by using a single-layered quantum rod, a polarization selection ratio, $E(L_{P-\lambda2}):E(L_{S-\lambda2})$, is 81:1.

By including a multi-layered quantum rod, an emission light energy value may be reduced, but a polarization selection ratio may be raised. The polarization selection color filter 100 having this performance may be utilized to raise, for example, a contrast ratio of a display device.

Figure 4:
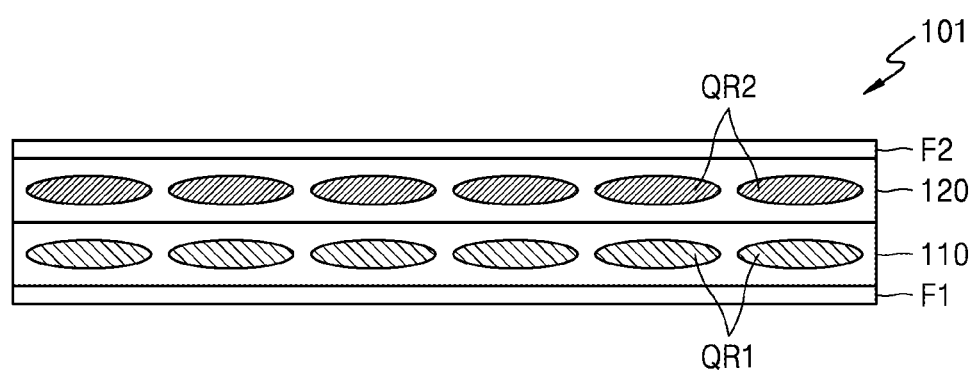
FIG. 4 is a cross-sectional view illustrating a configuration of a polarization selection color filter, according to another exemplary embodiment.

FIG. 4 is a cross-sectional view illustrating a configuration of a polarization selection color filter 101, according to another exemplary embodiment. The polarization selection color filter 101 includes the first color conversion layer 110, the second color conversion layer 120 formed on an upper surface of the first color conversion layer 110, a band pass filter F1 formed on a lower surface of the first color conversion layer 110, and a band cut filter F2 formed on an upper surface of the second color conversion layer 120.

The band pass filter F1 is a filter that transmits a wavelength band desired to be incident to the first color conversion layer 110, for example, light of the first wavelength. The band cut filter F2 is a filter that blocks light having the first wavelength that remains without being converted by the second color conversion layer 120 into the third wavelength.

Figure 5:
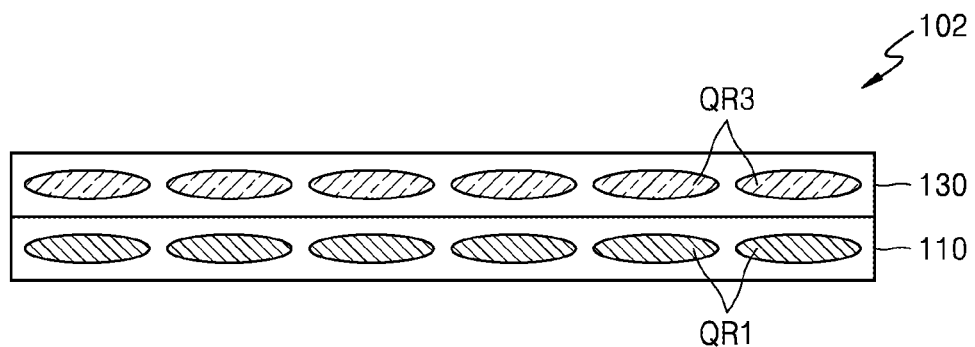
FIG. 5 is a cross-sectional view illustrating a configuration of a polarization selection color filter, according to another exemplary embodiment.

FIG. 5 is a cross-sectional view illustrating a configuration of a polarization selection color filter 102, according to another exemplary embodiment. The polarization selection color filter 102 includes the first color conversion layer 110 and the second color conversion layer 130. The first color conversion layer 110 includes the plurality of first quantum rods QR1 absorbing blue light and emitting light of a cyan color. The second color conversion layer 130 includes a plurality of third quantum rods QR3 absorbing the light of the cyan color and emitting green light. In this case, the polarization selection color filter 102 converts blue light into green light and emits the same.

Although not shown, a band pass filter that transmits blue light may be further provided on a lower surface of the first color conversion layer 110, and a band cut filter that blocks blue light may be further provided on an upper surface of the second color conversion layer 130.

Figure 6:
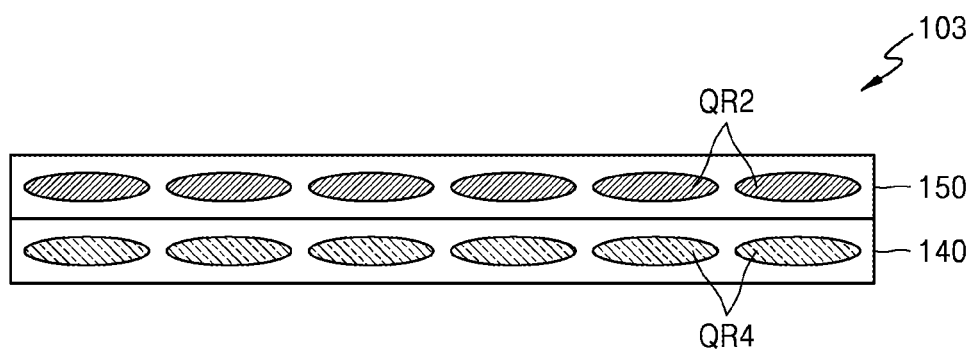
FIG. 6 is a cross-sectional view illustrating a configuration of a polarization selection color filter, according to another exemplary embodiment.

FIG. 6 is a cross-sectional view illustrating a configuration of a polarization selection color filter 103, according to another exemplary embodiment. The polarization selection color filter 103 includes a first color conversion layer 140 and a second color conversion layer 150. The first color conversion layer 140 includes a plurality of fourth quantum rods QR4 absorbing ultraviolet (UV) light and emitting blue light. The second color conversion layer 150 includes the plurality of second quantum rods QR2 absorbing blue light and emitting red light. In this case, the polarization selection color filter 103 converts UV light into red light and emits the same. Although not shown, a band pass filter that transmits UV light may be further provided on a lower surface of the first color conversion layer 140, and a band cut filter that blocks UV light may be further provided on an upper surface of the second color conversion layer 150.

Figure 7:
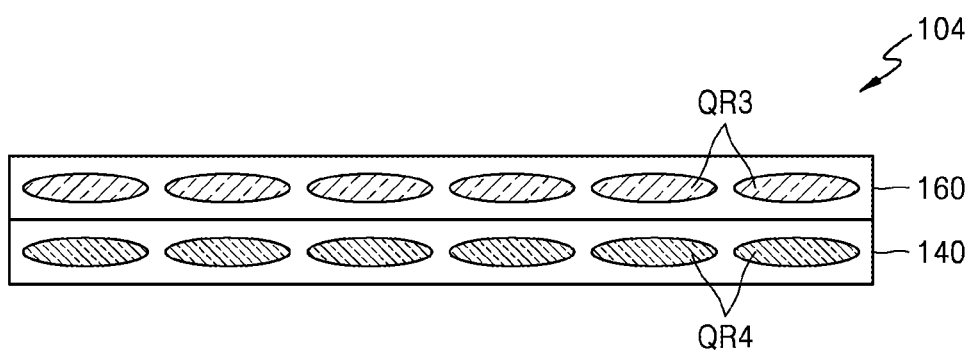
FIG. 7 is a cross-sectional view illustrating a configuration of a polarization selection color filter, according to another exemplary embodiment.

FIG. 7 is a cross-sectional view illustrating a configuration of a polarization selection color filter 104, according to another exemplary embodiment. The polarization selection color filter 104 includes the first color conversion layer 140 and a second color conversion layer 160. The first color conversion layer 140 includes the plurality of fourth quantum rods QR4 absorbing UV light and emitting blue light. The second color conversion layer 160 includes the plurality of third quantum rods QR3 absorbing blue light and emitting green light. In this case, the polarization selection color filter 104 converts UV light into green light and emits the same. Although not shown, a band pass filter that transmits UV light may be further provided on a lower surface of the first color conversion layer 140, and a band cut filter that blocks UV light may be further provided on an upper surface of the second color conversion layer 160.

The above-described polarization selection color filters 100, 101, 102, 103, and 104 may be appropriately combined and repeatedly arranged and applied as a color filter array for a display device.

Figure 8A:
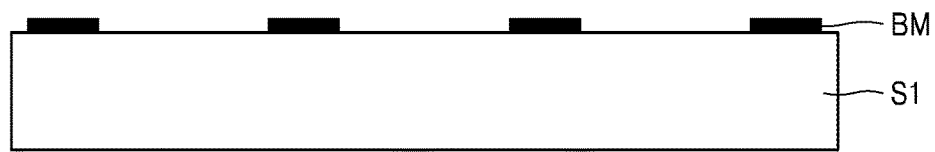
FIGS. 8A to 8F are views for explaining a method of manufacturing a color filter array layer for a display device by using a polarization selection color filter, according to an exemplary embodiment.

FIGS. 8A to 8F are views for explaining a method of manufacturing a color filter array layer for a display device by using a polarization selection color filter, according to an exemplary embodiment. As illustrated in FIG. 8A, a black matrix BM is formed on a substrate S1. The substrate S1 may be a transparent substrate for a display device.

Figure 8B:
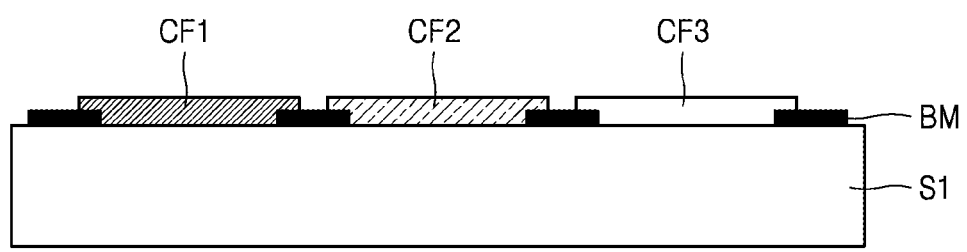

Next, as illustrated in FIG. 8B, color filters CF1, CF2, and CF3 are formed. For example, the color filters may be the red color filter CF1, the green color filter CF2, and the blue color filter CF3. The color filters CF1, CF2, and CF3 may be dye type color filters, and all or a portion of the color filters CF1, CF2, and CF3 may be omitted.

Figure 8C:
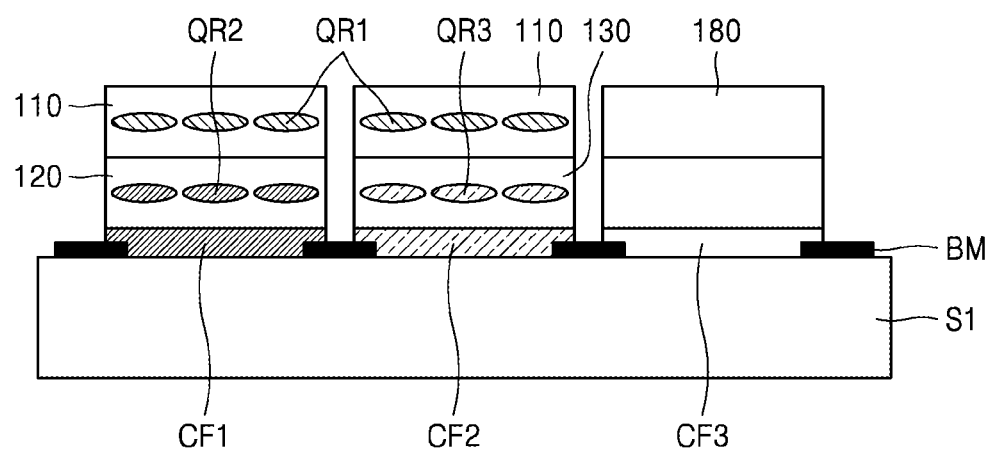

Next, as illustrated in FIG. 8C, the color conversion layers 110, 120, and 130 including the quantum rods QR1, QR2, and QR3 are formed. A transparent material layer 180 is formed on the blue color filter CF3.

Figure 8D:
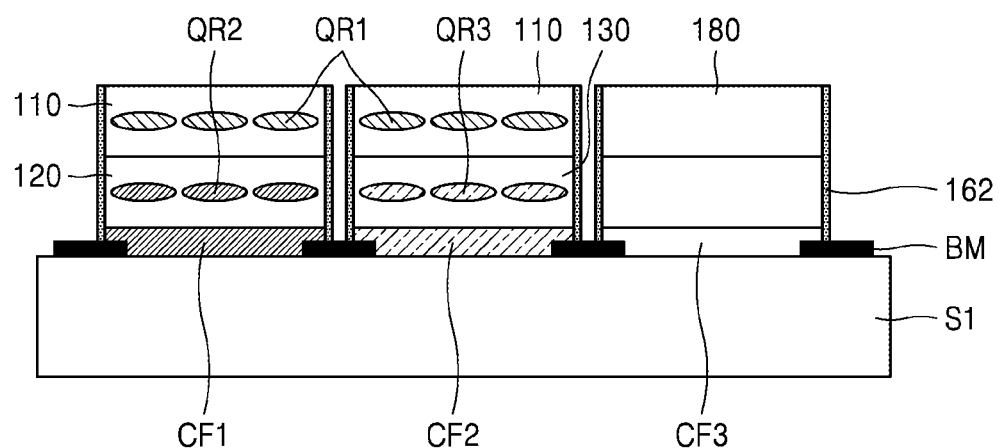
Figure 8E:
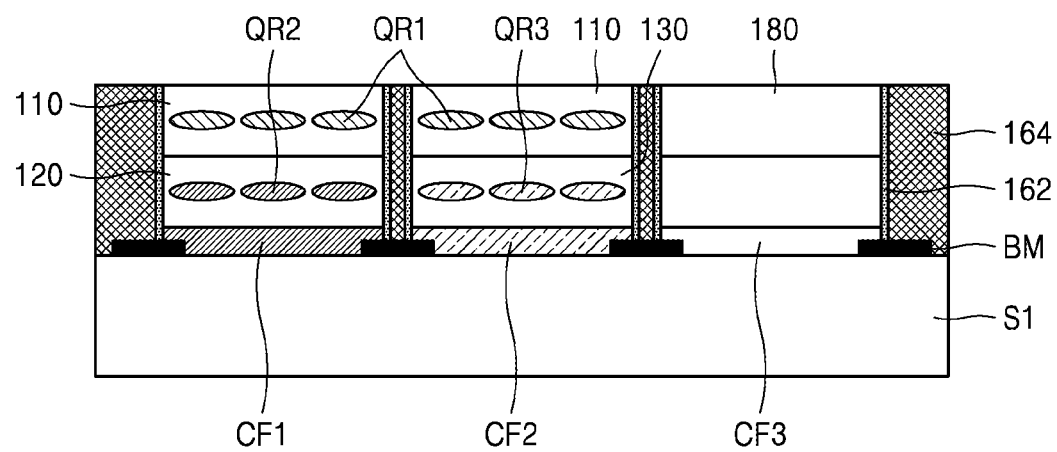

Next, as illustrated in FIG. 8D, a partition wall 162 defining a pixel region is formed, and a planarization layer 164 is formed as illustrated in FIG. 8E. The partition wall 162 may include the same material as that of the black matrix BM, or a metallic material that reflects light.

Figure 8F:
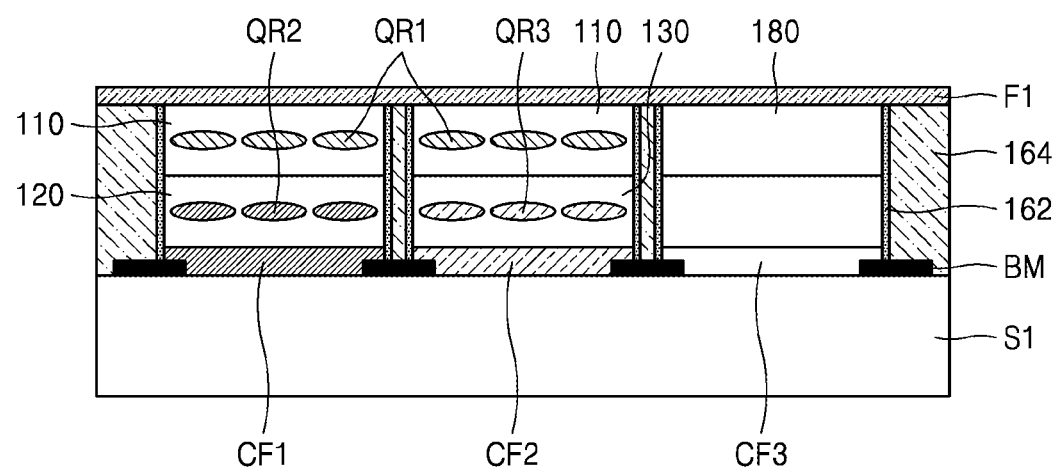

Next, as illustrated in FIG. 8F, a band pass filter F1 is formed. The band pass filter F1 may be a filter that transmits light in a wavelength band desired to be incident on the color conversion layer 110 and the transparent material layer 180. The band pass filter F1 may be omitted in some embodiments.

A component such as a common electrode may be further formed on the band pass filter F1, and a polarizer may be further formed on a lower surface of the substrate S1. The above-formed substrate may be an upper substrate of a display device.

Figure 9:
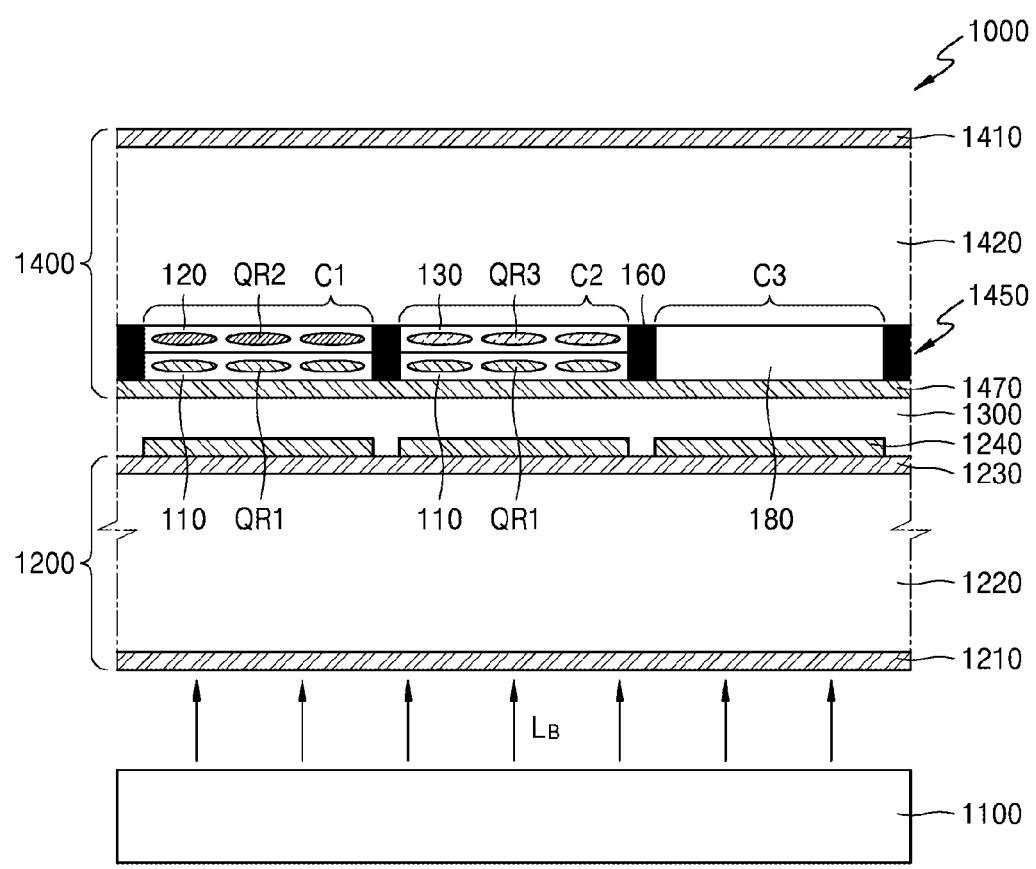
FIG. 9 is a cross-sectional view illustrating a configuration of a display device, according to an exemplary embodiment.

FIG. 9 is a cross-sectional view illustrating a configuration of a display device 1000, according to an exemplary embodiment. The display device 1000 includes a lower substrate 1200, an upper substrate 1400, and a liquid crystal (LC) layer 1300 that is disposed between the lower substrate 1200 and the upper substrate 1400. The upper substrate 1400 includes a color filter array layer 1450 that uses one of the polarization selection color filters exemplified in FIGS. 1 to 7.

The display device 1000 may further include a backlight unit 1100 for providing light for producing an image to the LC layer 1300. The backlight unit 1100 may include a light source that emits blue light LB, and provide the blue light LB to the LC layer 1300.

The lower substrate 1200 includes a first substrate 1220, a lower polarizer 1210 formed on a lower surface of the first substrate 1220, and a pixel electrode 1240 formed on an upper surface of the first substrate 1220. In addition, a thin film transistor (TFT) array layer 1230 including a plurality of transistors for respectively controlling regions of the LC layer 1300 that correspond to individual pixels is disposed between the first substrate 1220 and the pixel electrode 1240. The first substrate 1220 may include glass or a transparent plastic material.

The lower polarizer 1210 disposed on the lower surface of the first substrate 1220 is intended for transmitting only light of specific polarization. For example, the lower polarizer 1210 may be a polarizer for transmitting light of S-polarization (⊙).

The TFT array layer 1230 may include a plurality of transistors (not shown), a gate line and a data line for applying a gate signal and a data signal to each of the plurality of transistors. The pixel electrode 1240 is connected with a drain electrode of a transistor formed in the TFT array layer 1230 and receives a data voltage.

The upper substrate 1400 includes a second substrate 1420, an upper polarizer 1410 formed on an upper surface of the second substrate 1420, a color filter array layer 1450 and a common electrode 1470 formed on a lower surface of the second substrate 1420. The upper polarizer 1410 may be a polarizer that transmits light of P-polarization (↔) perpendicular to polarized light transmitted by the lower polarizer 1210. However, this is exemplary only, and both the upper polarizer 1410 and the lower polarizer 1210 may be configured to transmit light of the same polarization.

The color filter array layer 1450 includes a first color region C1, a second color region C2, and a third color region C3. Light passing through the LC layer 1300 is incident to the first color region C1, the second color region C2, and the third color region C3 that emit light of a first color, light of a second color, and light of a third color, respectively. The first color region C1, the second color region C2, and the third color region C3 may be defined by the partition walls 162 as illustrated in FIG. 8D.

One of the polarization selection color filters described with reference to FIGS. 1 to 7 may be applied to at least one of the first color region C1, the second color region C2, and the third color region C3. For example, as illustrated, the first color region C1 may include the first color conversion layer 110 including the plurality of first quantum rods QR1 absorbing light of the first wavelength and emitting light of the second wavelength that is longer than the first wavelength, and the second color conversion layer 120 including the plurality of second quantum rods QR2 absorbing light of the second wavelength and emitting light of the third wavelength that is longer than the second wavelength. In addition, the second color region C2 may include the first color conversion layer 110 including the plurality of first quantum rods QR1 absorbing light of the first wavelength and emitting light of the second wavelength that is longer than the first wavelength, and the second color conversion layer 130 disposed on the first color conversion layer 110, and including the plurality of third quantum rods QR3 absorbing light of the second wavelength and emitting light of the fourth wavelength that is longer than the second wavelength.

The third color region C3 may include the transparent material layer 180, and a scattering material may be distributed inside the transparent material layer 180. In the present example, the first wavelength, the second wavelength, and the third wavelength may be a blue wavelength band, a cyan wavelength band, and a red wavelength band. That is, blue light is converted by the first color region C1 and the second color region C2, so that a red color and a green color are respectively produced. Since the third color region C3 includes the transparent material layer 180 that directly transmits incident blue light, a blue color is produced by the third color region C3.

The common electrode 1470 is formed on a lower surface of the color filter array substrate 1450. The LC layer 1300 is disposed between the upper substrate 1400 and the lower substrate 1200, and the arrangement of LC molecules included in the LC layer 1300 is adjusted depending on a voltage applied between the common electrode 1470 and the pixel electrode 1240. A region of the LC layer 1300 between the common electrode 1470 and the pixel electrode 1240 is controlled depending on a voltage between the common electrode 1470 and the pixel electrode 1240, so that the LC layer 1300 is controlled to a mode (on) that changes the polarization of incident light and a mode (off) that does not change the polarization of incident light. A degree that changes the polarization of incident light can be adjusted, so that intermediate grayscale expression is possible.

Figure 10A:
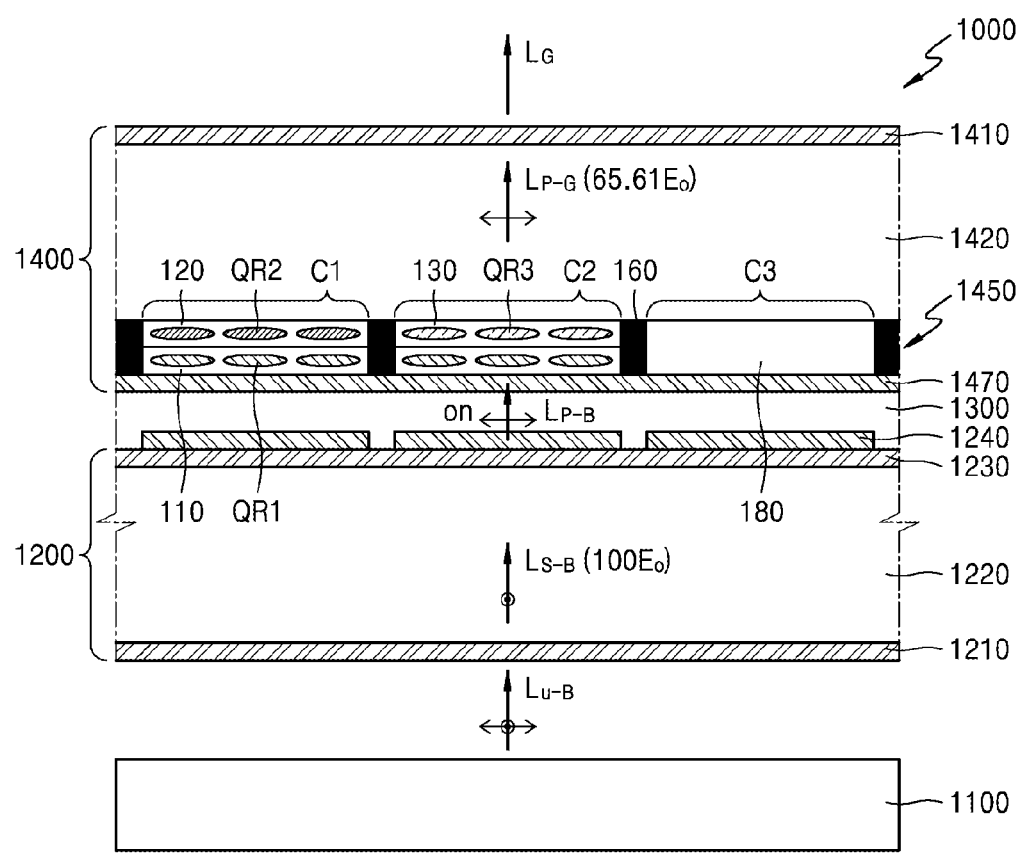
FIGS. 10A and 10B are conceptual views for explaining the display device of FIG. 9 having a high contrast ratio, and illustrating an energy change of incident light according to a light path, with respect to pixel on/off mode, respectively.
Figure 10B:
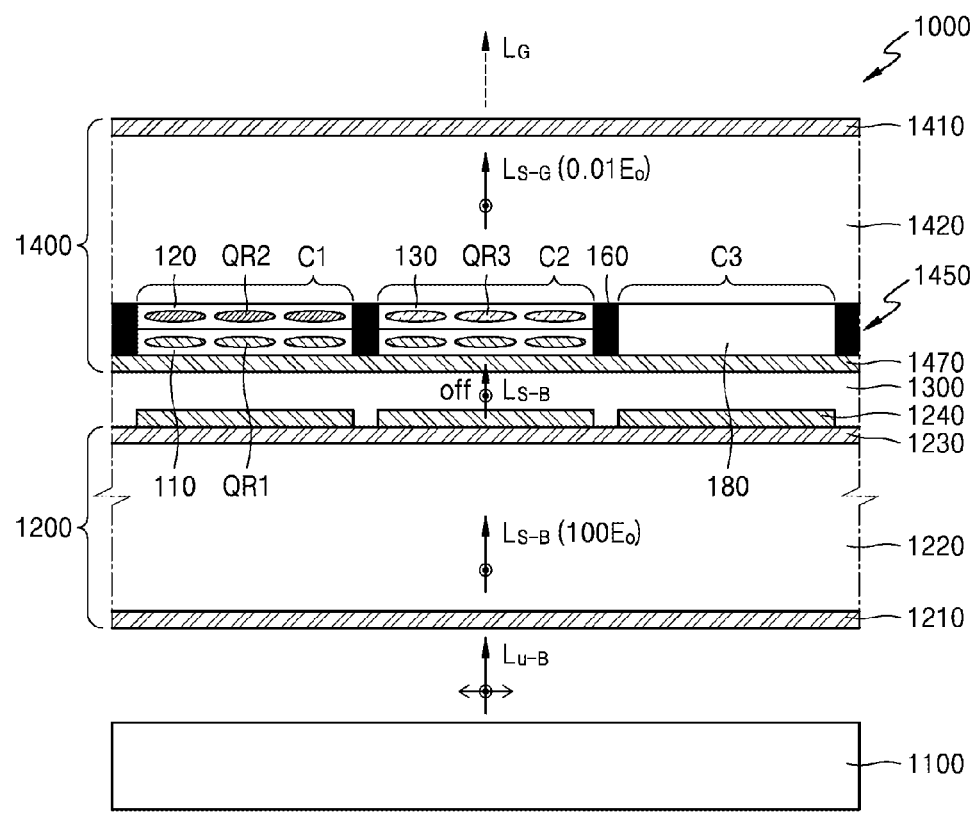

FIGS. 10A and 10B are conceptual views for explaining the display device 1000 of FIG. 9 having a high contrast ratio, and illustrating an energy change of incident light according to a light path, with respect to pixel on/off mode, respectively. Referring to FIG. 10A, unpolarized blue light $L_{u-B}$ provided from the backlight unit 1100 is converted into blue light $L_{S-B}$ of S-polarization after passing through the lower polarizer 1210. The blue light $L_{S-B}$ of S-polarization is incident on the LC layer 1300. FIG. 10A illustrates a state in which a region of the LC layer 1300 that corresponds to the second color region C2 is turned on, that is, a mode in which the polarization of the incident light is converted into P-polarization. In this case, the blue light $L_{S-B}$ of S-polarization is converted into blue light $L_{P-B}$ of P-polarization after passing through the LC layer 1300. The blue light $L_{P-B}$ of P-polarization incident on the second color region C2 is converted into green light $L_{P-G}$ of P-polarization after passing through the first color conversion layer 110 and the second color conversion layer 130. Assuming that the blue light $L_{S-B}$ of S-polarization that has passed through the lower polarizer 1210 is $100E_0$, the energy of the emitted green light $L_{P-G}$ of P-polarization is $65.61E_0$. This is because a color conversion efficiency when light passes through the first color conversion layer 110 of the second color region C2 is about 81%, and a color conversion efficiency when light passes through the second color conversion layer 120 again is about 81% as was described with reference to FIG. 3A where an absorption rate and an emission rate of the first and second quantum rods QR1 and QR2 for light of P-polarization are about 90% and about 90%, respectively.

The green light $L_{P-G}$ of P-polarization having energy of $65.61E_0$ passes through the upper polarizer 1410 that transmits P-polarized light, and a green color is displayed. Since the polarization efficiency of the upper polarizer 1410 is not about 100%, all of the green light $L_{P-G}$ of P-polarization may not pass through the upper polarizer 1410, and the light energy of the transmitted green light $L_{P-G}$ may be less than $65.61E_0$. For the convenience of description of a contrast ratio, light energy during a pixel-on that is a reference of the contrast ratio is determined as a value before light passes through the upper polarizer 1410.

Referring to FIG. 10B, unpolarized blue light $L_{u-B}$ provided from the backlight unit 1100 is converted into blue light $L_{S-B}$ of S-polarization after passing through the lower polarizer 1210. The blue light $L_{S-B}$ of S-polarization is incident on the LC layer 1300. FIG. 10B illustrates a state in which a region of the LC layer 1300 that corresponds to the second color region C2 is turned off, that is, the polarization of incident light is maintained as S-polarization even after the incident light passes through the LC layer 1300. In this case, the blue light $L_{S-B}$ of S-polarization maintains an S-polarization direction even after passing through the LC layer 1300. Next, the blue light $L_{S-B}$ of S-polarization incident on the second color region C2 is converted into green light $L_{S-G}$ of S-polarization after passing through the first color conversion layer 110 and the second color conversion layer 130. Assuming that the blue light $L_{S-B}$ of S-polarization that has passed through the lower polarizer 1210 is $100E_0$, the energy of the emitted green light $L_{S-G}$ of S-polarization is $0.01E_0$. This is because a color conversion efficiency when light passes through the first conversion layer 110 of the second color region C2 is about 1% and a color conversion efficiency when light passes through the second color conversion layer 120 again is about 1% as was described with reference to FIG. 3B where an absorption rate and an emission rate of the first and second quantum rods QR1 and QR2 for light of S-polarization are about 10% and about 10%, respectively.

The green light $L_{S-G}$ of S-polarization having energy of $0.01E_0$ may not pass through the upper polarizer 1410 that transmits P-polarized light. However, since the polarization efficiency of the upper polarizer 1410 is not about 100%, a portion of the green light $L_{S-G}$ of S-polarization may pass through the upper polarizer 1410. In this case, light energy of the transmitted green light $L_{S-G}$ may be a value greater than 0 and less than 0.01E0. For the convenience of description of a contrast ratio, light energy during a pixel-off that is a reference of the contrast ratio is determined as a value before light passes through the upper polarizer 1410. When a contrast ratio is examined by comparing FIG. 10A with FIG. 10B by comparing light energy of the case where the second color region C2 is pixel-on with light energy of the case where the second color region C2 is pixel-off, the contrast ratio is 6561:1.

Such a contrast ratio represents a very large value compared with, for example, the case of configuring the color region C2 by using a single-layered quantum rod. In the case of configuring the color region C2 by using a single-layered quantum rod, a contrast ratio may represent a low value as the polarization selection ratio of 81:1 as was described with reference to FIGS. 3A and 3B.

The above contrast ratio is a result obtained on the assumption that both absorption rates and emission rates of the applied first and third quantum rods QR1 and QR3 are 90%. The contrast ratio may be further raised by determining a material and an aspect ratio such that the absorption rates and emission rates of the applied first and third quantum rods QR1 and QR3 are higher than 90%.

Since colors are produced by applying the quantum rod to the color filter array layer 1450, color reproduction is improved, and light efficiency is raised compared with the case of using an absorption type color filter. In addition, a contrast ratio is raised by disposing quantum rods of different kinds in two layers, for example, the first and second quantum rods QR1 and QR2 in two layers, and the first and third quantum rods QR1 and QR3 in two layers.

Figure 11:
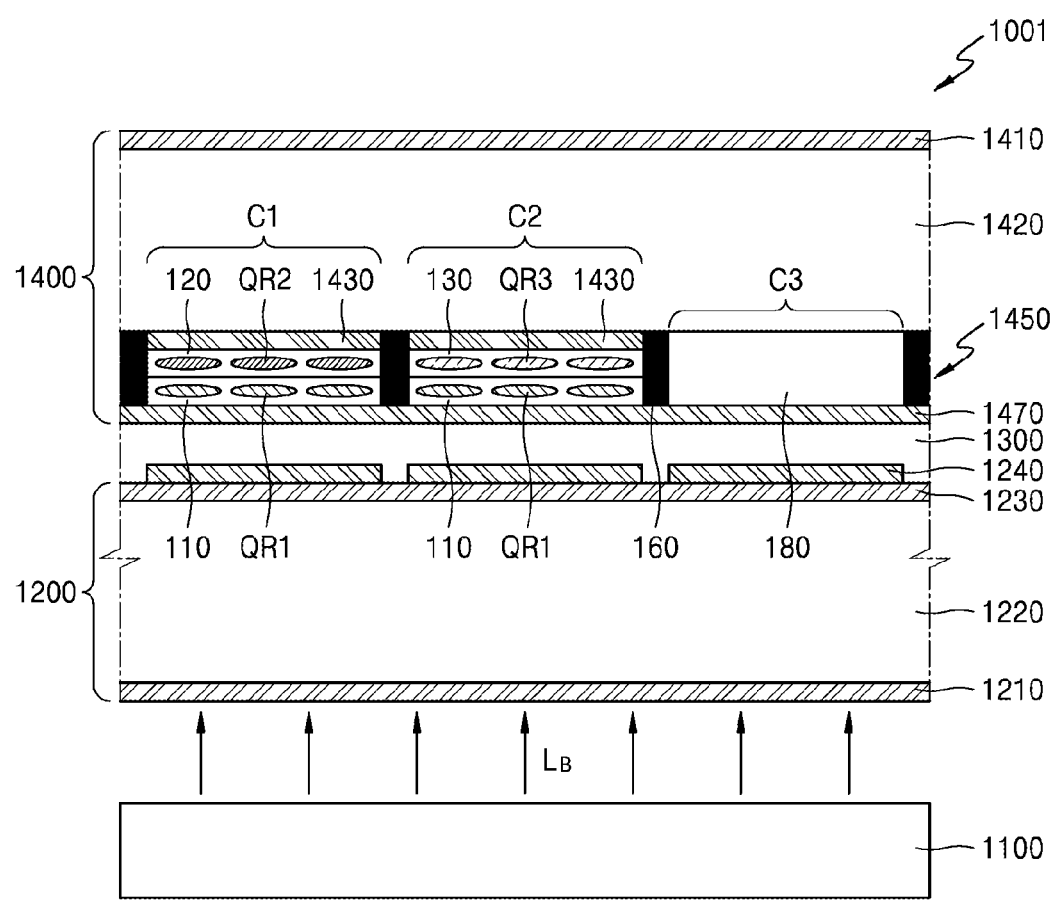
FIG. 11 is a cross-sectional view illustrating a configuration of a display device, according to another exemplary embodiment.

A display device according to various exemplary embodiments is described below. FIG. 11 is a cross-sectional view illustrating a configuration of a display device 1001, according to another exemplary embodiment. The display device 1001 is different from the display device 1000 of FIG. 9 in that a band cut filter 1430 is further provided on the second color conversion layer 120 of the first color region C1 and the second color conversion layer 130 of the second color region C2. The band cut filter 1430 is a filter that blocks blue light so that the blue light that is not converted into red light and green light by the first color region C1 and the second color region C2 may not be emitted from among blue light incident on the first color region C1 and the second color region C2.

Figure 12:
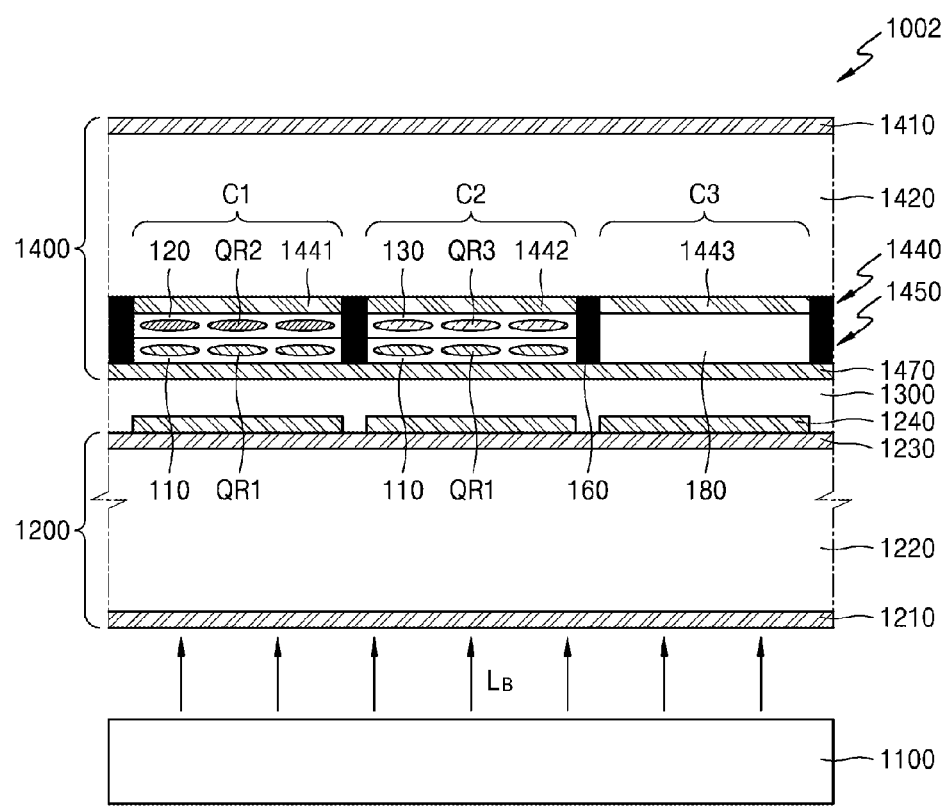
FIG. 12 is a cross-sectional view illustrating a configuration of a display device, according to another exemplary embodiment.

FIG. 12 is a cross-sectional view illustrating a configuration of a display device 1002, according to another exemplary embodiment. The display device 1002 is different from the display device 1000 of FIG. 9 in that a red color filter 1441, a green color filter 1442, and a blue color filter 1443 are further formed on the first color region C1, the second color region C2, and the third color region C3, respectively. Since the red color filter 1441 and the green color filter 1442 are filters that transmit red light and green light, respectively, and thus may prevent light that is not converted into red light and green light by the first color region C1 and the second color region C2 from among blue light that is incident on the first color region C1 and the second color region C2 from passing through the first color region C1 and the second color region C2. The color filters 1441, 1442, and 1443 may be dye type color filters, and the blue color filter 1443 may be omitted in some embodiments.

Figure 13:
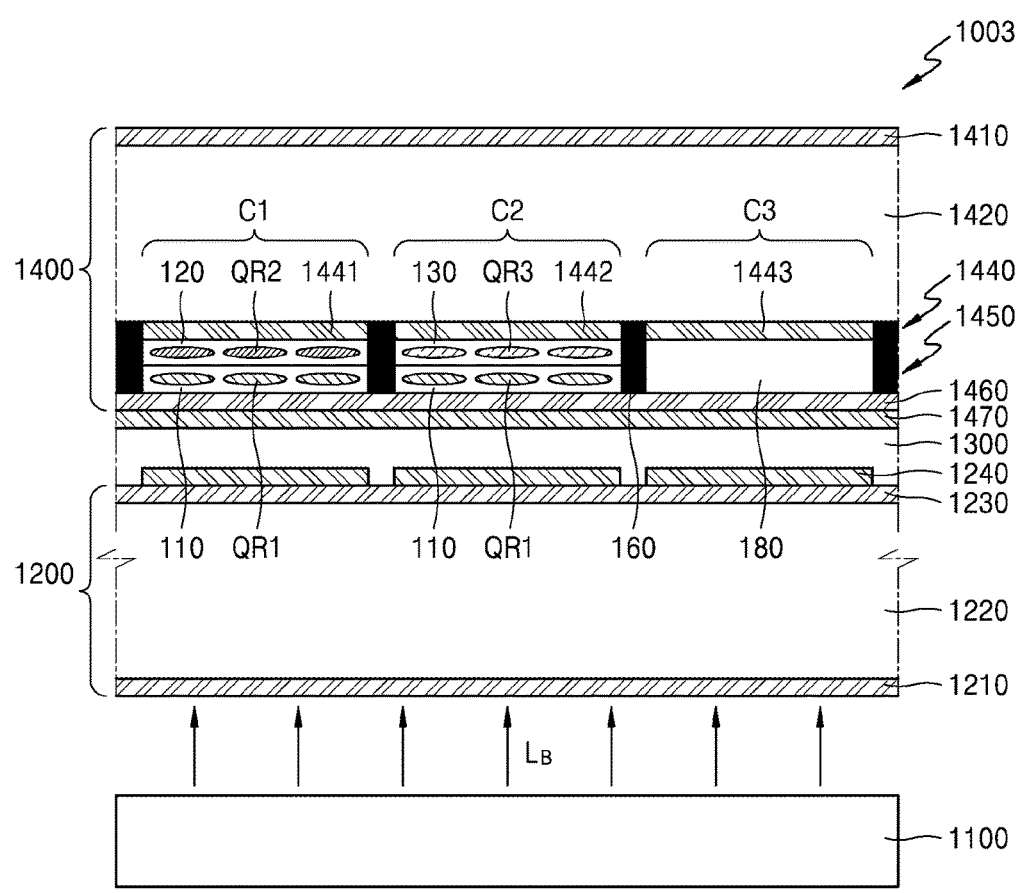
FIG. 13 is a cross-sectional view illustrating a configuration of a display device, according to another exemplary embodiment.

FIG. 13 is a cross-sectional view illustrating a configuration of a display device 1003, according to another exemplary embodiment. The display device 1003 is different from the display device 1002 of FIG. 12 in that a band pass filter 1460 is further formed below the color filter array layer 1450. Since the band pass filter 1460 is a filter that transmits light in a wavelength band desired to be incident on the color filter array layer 1450, the disposed location of the band pass filter 1460 may be not only at the illustrated location but also at other locations between the color filter array layer 1450 and the backlight unit 1100. The band pass filter 1460 may be applied to the display device 1000 of FIG. 9 or the display device 1002 of FIG. 11.

Figure 14:
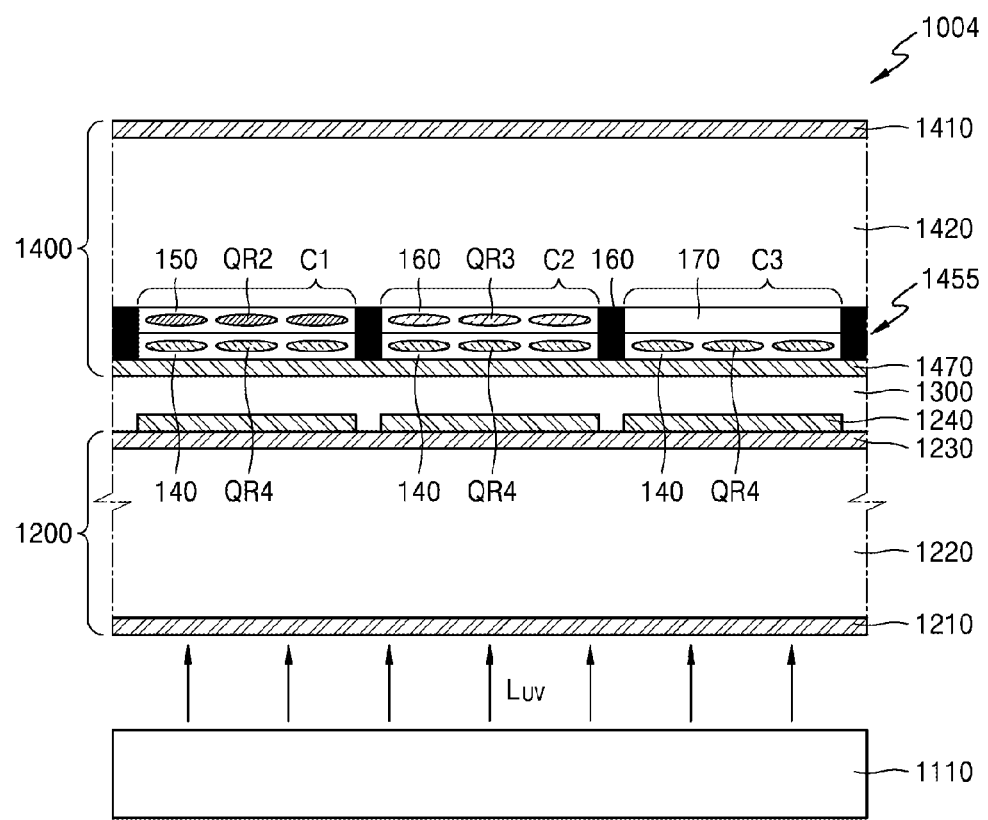
FIG. 14 is a cross-sectional view illustrating a configuration of a display device, according to another exemplary embodiment.

FIG. 14 is a cross-sectional view illustrating a configuration of a display device 1004, according to another exemplary embodiment. The display device 1004 includes the backlight unit 1110 providing UV light $L_{UV}$, and is different from the display device 1000 of FIG. 9 in its specific construction of the color filter array layer 1455. The color filter array layer 1455 includes the first color region C1, the second color region C2, and the third color region C3. The first color region C1 includes a first color conversion layer 140 including the plurality of fourth quantum rods QR4 absorbing UV light and emitting blue light, and a second color conversion layer 150 disposed on the first color conversion layer 140 and including the plurality of second quantum rods QR2 absorbing blue light and emitting red light. The second color region C2 includes the first color conversion layer 140 including the plurality of fourth quantum rods QR4 absorbing UV light and emitting blue light, and a second color conversion layer 160 disposed on the first color conversion layer 140 and including the plurality of third quantum rods QR3 absorbing blue light and emitting green light. The third color region C3 includes the first color conversion layer 140 including the plurality of fourth quantum rods QR4 absorbing UV light and emitting blue light. A transparent material layer 170 may be further formed on the first color conversion layer 140.

In the display device 1004 according to an exemplary embodiment, the third color region C3 in the above-described exemplary embodiments 1000, 1001, 1002, and 1003 includes only the transparent material layer 180, so that a smaller emission angle of blue light than those of red light and green light produced in the first and second color regions C1 and C2 may be complemented. Since the third color region C3 introduces the color conversion layer 140 including a single-layered quantum rod, emission angles of red light, green light, and blue light produced in the first to third color regions C1, C2, and C3 may become similar to each other.

Figure 15:
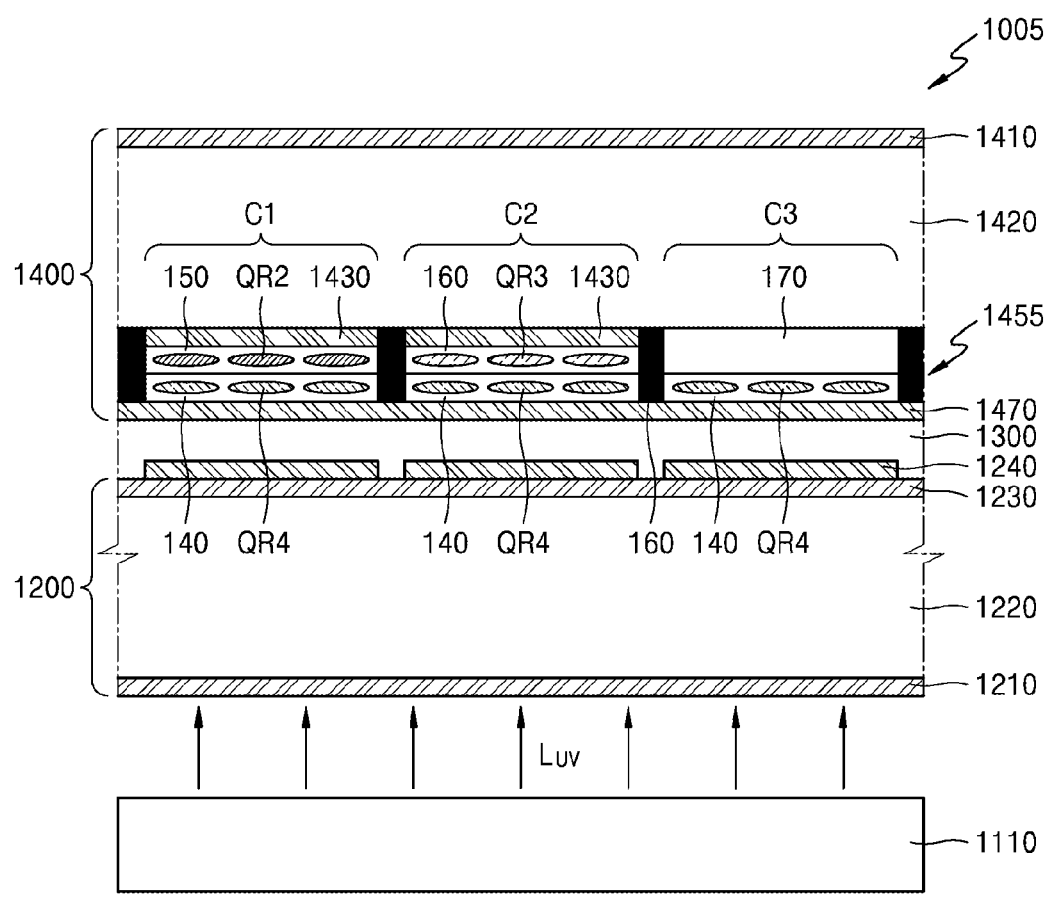
FIG. 15 is a cross-sectional view illustrating a configuration of a display device, according to another exemplary embodiment.

FIG. 15 is a cross-sectional view illustrating a configuration of a display device 1005, according to another exemplary embodiment. The display device 1005 is different from the display device 1004 of FIG. 14 in that a band cut filter 1430 is further provided on the second color conversion layer 150 of the first color region C1 and the second color conversion layer 160 of the second color region C2. The band cut filter 1430 is a filter that blocks light so that UV light that is not converted into a red color and a green color by the first color region C1, and the second color region C2 may not be emitted among UV light incident on the first color region C1 and the second color region C2.

Figure 16:
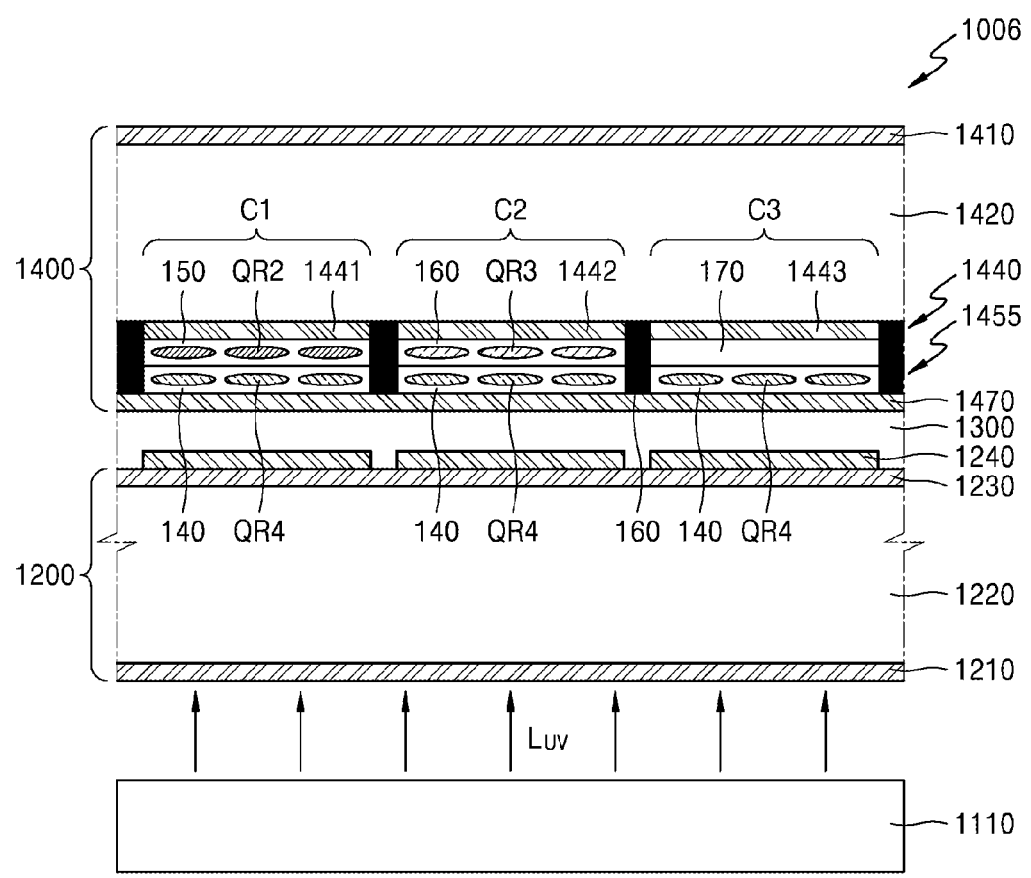
FIG. 16 is a cross-sectional view illustrating a configuration of a display device, according to another exemplary embodiment.

FIG. 16 is a cross-sectional view illustrating a configuration of a display device 1006, according to another exemplary embodiment. The display device 1006 is different from the display device 1004 of FIG. 14 in that the red color filter 1441, the green color filter 1442, and the blue color filter 1443 are further formed on the first color region C1, the second color region C2, and the third color region C3, respectively. Since the red color filter 1441, the green color filter 1442, and the blue color filter 1443 are filters that transmit red light, green light, and blue light, the red color filter 1441, the green color filter 1442, and the blue color filter 1443 may prevent light that is not converted into red light, green light, and blue light by the first color region C1, the second color region C2, and the third color region C3, respectively, from among UV light incident on the first color region C1, the second color region C2, and the third color region C3 from being transmitted. The color filters 1441, 1442, and 1443 may dye type color filters, respectively.

Figure 17:
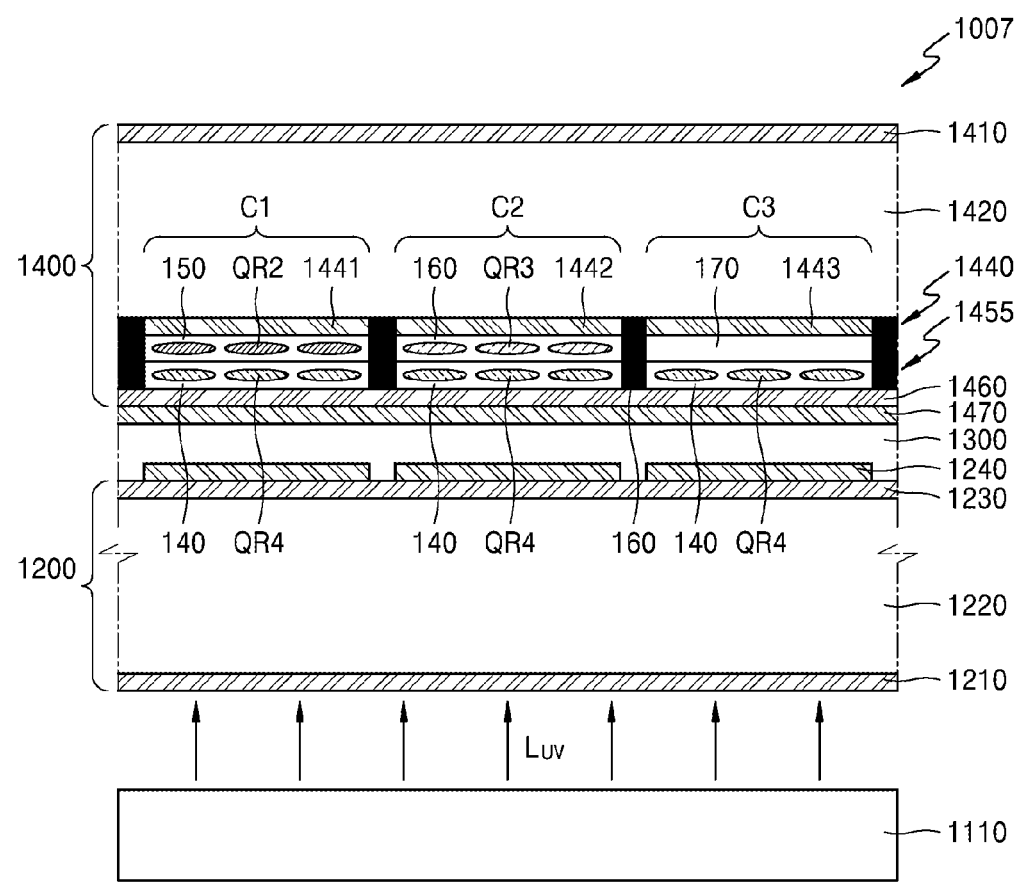
FIG. 17 is a cross-sectional view illustrating a configuration of a display device, according to another exemplary embodiment.

FIG. 17 is a cross-sectional view illustrating a configuration of a display device 1007, according to another exemplary embodiment. The display device 1007 is different from the display device 1006 of FIG. 16 in that the band pass filter 1460 is further formed below the color filter array layer 1455. Since the band pass filter 1460 is a filter that transmits light in a wavelength band desired to be incident on the color filter array layer 1455, the disposed location of the band pass filter 1460 may be not only at the illustrated location but also at other locations between the color filter array layer 1455 and the backlight unit 1110. The band pass filter 1460 may be applicable to the display device 1004 of FIG. 14 or the display device 1005 of FIG. 15.

The above-described polarization selection color filter includes a plurality of layers having different kinds of quantum rods, and thus a polarization ratio of color conversion efficiency is high. The above-described polarization selection color filter is applicable to a display device, and may implement a high contrast ratio together with high color reproduction and high light efficiency.

Although the present disclosure has been described with reference to exemplary embodiments illustrated in the drawings, these embodiments are provided for an exemplary purpose only, and one of ordinary skill in the art will understand that various modifications and other equivalent embodiments may be made therein without deviating from the spirit and scope of the present disclosure.

What is claimed is:

1. A polarization selection color filter comprising:
   a first color conversion layer comprising a plurality of first quantum rods absorbing light of a first wavelength and emitting light of a second wavelength that is longer than the first wavelength; and
   a second color conversion layer comprising a plurality of second quantum rods disposed on the first color conversion layer, absorbing the light of the second wavelength and emitting light of a third wavelength that is longer than the second wavelength,
   wherein the plurality of first quantum rods has a core having a first size and a shell having a first length in a major axis and a second length in a minor axis that is different from the first length, and a first aspect ratio of the shell of the plurality of first quantum rods is determined by a ratio of the first length and the second length,
   wherein the plurality of second quantum rods has a core having a second size and a shell having a third length in a major axis and a fourth length in a minor axis that is different from the third length, and a second aspect ratio of the shell of the plurality of second quantum rods is determined by a ratio of the third length and the fourth length,
   wherein the first size of the core of the plurality of first quantum rods is different from the second size of the core of the plurality of second quantum rods,
   wherein the first aspect ratio of the shell of the plurality of first quantum rods and the second aspect ratio of the shell of the plurality of second quantum rods are substantially same,
   wherein a polarization selection ratio of the polarization selection color filter is controllably determined from the first aspect ratio of the plurality of first quantum rods and the second aspect ratio of the plurality of second quantum rods, and wherein the plurality of first quantum rods and the plurality of second quantum rods are arranged so that color conversion efficiency for light of first polarization is higher than color conversion efficiency for light of second polarization perpendicular to the first polarization.

2. The polarization selection color filter of claim 1, further comprising:
a band pass filter disposed below the first color conversion layer and transmitting the light of the first wavelength.

3. The polarization selection color filter of claim 1, further comprising:
a band cut filter disposed above the second color conversion layer and blocking the light of the first wavelength.

4. The polarization selection color filter of claim 1, wherein the first color conversion layer absorbs blue light and emits light of a cyan color, and the second color conversion layer absorbs the light of the cyan color and emits red light.

5. The polarization selection color filter of claim 1, wherein the first color conversion layer absorbs blue light and emits light of a cyan color, and the second color conversion layer absorbs the light of the cyan color and emits green light.

6. The polarization selection color filter of claim 1, wherein the first color conversion layer absorbs ultraviolet light and emits blue light, and the second color conversion layer absorbs the blue light and emits red light.

7. The polarization selection color filter of claim 1, wherein the first color conversion layer absorbs ultraviolet light and emits blue light, and the second color conversion layer absorbs the blue light and emits green light.

8. A display device comprising:
a lower substrate comprising a first substrate, a lower polarizer disposed below the first substrate, and a pixel electrode disposed above the first substrate;
an upper substrate comprising a second substrate, an upper polarizer disposed above the second substrate, and a color filter array layer and a common electrode disposed below the second substrate; and
a liquid crystal layer disposed between the lower substrate and the upper substrate,
wherein the color filter array layer comprises a first color region, a second color region, and a third color region to which light that has passed through the liquid crystal layer is incident and that emit light of a first color, light of a second color, and light of a third color, respectively, and
the first color region comprises:
a first color conversion layer comprising a plurality of first quantum rods absorbing light of a first wavelength and emitting light of a second wavelength that is longer than the first wavelength; and
a second color conversion layer disposed on the first color conversion layer and comprising a plurality of second quantum rods absorbing the light of the second wavelength and emitting light of a third wavelength that is longer than the second wavelength,
wherein the plurality of first quantum rods has a core having a first size and a shell having a first length in a major axis and a second length in a minor axis that is different from the first length, and a first aspect ratio of the shell of the plurality of first quantum rods is determined by a ratio of the first length and the second length, wherein the plurality of second quantum rods has a core having a second size and a shell having a third length in a major axis and a fourth length in a minor axis that is different from the third length, and a second aspect ratio of the shell of the plurality of second quantum rods is determined by a ratio of the third length and the fourth length, wherein the first size of the core of the plurality of first quantum rods is different from the second size of the core of the plurality of second quantum rods, wherein the first aspect ratio of the shell of the plurality of first quantum rods and the second aspect ratio of the shell of the plurality of second quantum rods are substantially same, wherein a polarization selection ratio of the polarization selection color filter is controllably determined from the first aspect ratio of the plurality of first quantum rods and the second aspect ratio of the plurality of second quantum rods, and wherein the plurality of first quantum rods and the plurality of second quantum rods are arranged so that color conversion efficiency for light of first polarization is higher than color conversion efficiency for light of second polarization perpendicular to the first polarization.

9. The display device of claim 8, wherein the second color region comprises:
a third color conversion layer comprising the plurality of first quantum rods absorbing light of the first wavelength and emitting light of the second wavelength that is longer than the first wavelength; and
a fourth color conversion layer disposed on the third color conversion layer and comprising a plurality of third quantum rods absorbing light of the second wavelength and emitting light of a fourth wavelength that is longer than the second wavelength.

10. The display device of claim 9, further comprising:
a band pass filter disposed below the first color conversion layer and the third color conversion layer and transmitting the light of the first wavelength.

11. The display device of claim 9, further comprising:
a band cut filter disposed above the second color conversion layer and the fourth color conversion layer and blocking the light of the first wavelength.

12. The display device of claim 9, further comprising:
dye type first, second, and third color filters disposed on locations that respectively face the first, second, and third color regions, and transmitting the light of the first, second, and third colors between the color filter array layer and the second substrate.

13. The display device of claim 9, further comprising:
a backlight unit configured to provide blue light to the liquid crystal layer.

14. The display device of claim 13, wherein the plurality of first, second, and third quantum rods are configured such that the first color region emits red light and the second color region emits green light.

15. The display device of claim 14, wherein the plurality of first quantum rods convert the blue light into light of a cyan color, the plurality of second quantum rods convert the light of the cyan color into the red light, and the plurality of third quantum rods convert the light of the cyan color into the green light.

16. The display device of claim 14, wherein the third color region comprises a transparent material layer.

17. The display device of claim 9, further comprising:
a backlight unit configured to provide ultraviolet light to the liquid crystal layer.

18. The display device of claim 17, wherein the plurality of first, second, and third quantum rods are configured such that the first color region emits red light and the second color region emits green light.

19. The display device of claim 18, wherein the plurality of first quantum rods convert the ultraviolet light into blue light, the plurality of second quantum rods convert the blue light into the red light, and the plurality of third quantum rods convert the blue light into the green light.

20. The display device of claim 18, wherein the third color region comprises a fifth color conversion layer comprising a plurality of quantum rods converting the ultraviolet light into blue light.

* * * * *